(12) United States Patent
Quevallier et al.

(10) Patent No.: US 12,007,796 B2
(45) Date of Patent: Jun. 11, 2024

(54) THERMOSTATIC VALVE

(71) Applicant: NOVARES FRANCE, Clamart (FR)

(72) Inventors: Jean-Claude Quevallier, Lesquin (FR); Gilles Waymel, Hulluch (FR)

(73) Assignee: NOVARES FRANCE, Clamart (FR)

( * ) Notice: Subject to any disclaimer, the term of this patent is extended or adjusted under 35 U.S.C. 154(b) by 0 days.

(21) Appl. No.: 17/763,416

(22) PCT Filed: Oct. 16, 2020

(86) PCT No.: PCT/FR2020/051875
§ 371 (c)(1),
(2) Date: Mar. 24, 2022

(87) PCT Pub. No.: WO2021/079049
PCT Pub. Date: Apr. 29, 2021

(65) Prior Publication Data
US 2022/0390969 A1  Dec. 8, 2022

(30) Foreign Application Priority Data

Oct. 24, 2019 (FR) ..................... 19/11894

(51) Int. Cl.
*F16K 31/00* (2006.01)
*F01P 7/16* (2006.01)
(Continued)

(52) U.S. Cl.
CPC ............ *G05D 23/022* (2013.01); *F01P 7/167* (2013.01); *F16K 31/002* (2013.01);
(Continued)

(58) Field of Classification Search
CPC ...... F16K 31/002; F16K 31/047; F16K 31/50; G05D 23/022; G05D 23/1925; F01P 7/167
See application file for complete search history.

(56) References Cited

U.S. PATENT DOCUMENTS 2,833,478 A * 5/1958 Middleton ......... G05D 23/1333
236/51
3,907,199 A * 9/1975 Kreger .................. B60K 11/02
237/12.3 B
(Continued)

FOREIGN PATENT DOCUMENTS

EP 486757 A1 * 5/1992 .............. F01P 7/167
EP 1486843 A1 12/2004
FR 2434723 A1 3/1980

OTHER PUBLICATIONS

International Search Report dated Dec. 4, 2020 re: Application No. PCT/FR2020/051875, pp. 1-2, citing: EP 1486843 A1, U.S. Pat. No. 6,764,020 B1, U.S. Pat. No. 6,742,716 B1, U.S. Pat. No. 9,903,258 B1 and FR 2434723 A1.

*Primary Examiner* — Umashankar Venkatesan
(74) *Attorney, Agent, or Firm* — CANTOR COLBURN LLP

(57) ABSTRACT

A thermostatic valve includes a hollow body, two openings opening into the body and being hydraulically connected by a pass section, and a shut-off component arranged partially in the pass section and having a thermostatic actuator, a return component, a valve capable of opening the first opening when actuated by the thermostatic actuator and of closing the first opening when returned by the return component. The thermostatic actuator includes a cylinder containing an expansion material and a stem defining an axial direction. A relative movement between the cylinder and the stem along the axial direction occurs under the action of the expansion material. The stem bears at an ends against an abutment element, which is movable under the action of movement component in the direction of the cylinder to allow the opening of the first opening when the temperature of the expansion material is below the threshold temperature.

20 Claims, 5 Drawing Sheets

(51) Int. Cl.
   *F16K 31/04* (2006.01)
   *F16K 31/50* (2006.01)
   *G05D 23/02* (2006.01)
   *G05D 23/19* (2006.01)

(52) U.S. Cl.
   CPC ............ *F16K 31/047* (2013.01); *F16K 31/50* (2013.01); *G05D 23/1925* (2013.01)

(56) References Cited

U.S. PATENT DOCUMENTS

| | | | | |
|---|---|---|---|---|
| 4,550,693 A | * | 11/1985 | Saur | F01P 7/167 123/41.1 |
| 4,674,679 A | * | 6/1987 | Saur | F01P 7/167 236/51 |
| 4,848,652 A | * | 7/1989 | Kennedy | F01P 7/167 236/34.5 |
| 6,315,209 B1 | * | 11/2001 | Tripp | G05D 23/1346 236/12.13 |
| 6,343,746 B2 | * | 2/2002 | Chamot | F16K 31/04 236/34.5 |
| 6,695,217 B2 | * | 2/2004 | Leu | G05D 23/1393 236/DIG. 2 |
| 6,742,716 B1 | * | 6/2004 | Duprez | G05D 23/022 236/34.5 |
| 6,764,020 B1 | | 7/2004 | Zhao et al. | |
| 7,036,745 B2 | * | 5/2006 | Bouloy | F01P 7/167 236/101 R |
| 8,511,262 B2 | * | 8/2013 | Komurian | F16K 11/044 251/283 |
| 9,903,258 B1 | | 2/2018 | Tillman | |
| 10,024,219 B2 | * | 7/2018 | Lee | F16K 31/52416 |
| 10,877,498 B2 | * | 12/2020 | Hodges | G05D 23/022 |
| 2003/0150923 A1 | * | 8/2003 | Leu | G05D 23/1921 236/100 |
| 2009/0173295 A1 | * | 7/2009 | Fishman | F01P 7/167 123/41.08 |

\* cited by examiner

THERMOSTATIC VALVE

TECHNICAL FIELD

The present disclosure concerns the field of thermostatic valves. A thermostatic valve is typically used in the field of automatic thermal regulation for fluid circuits (gas, water, oil, etc.).

BACKGROUND

In a known manner, a thermostatic valve comprises a closed hollow body pierced with a first opening and a second opening and comprising a plug separating the two openings in a sealed manner. The plug is sensitive to the temperature of the fluid so as to open above a threshold temperature and to close below said threshold temperature.

An illustrative application in the automotive field is the making of water inlet casings (convergent) or water outlet casings (divergent).

The plug of a thermostatic valve typically comprises a thermostatic actuator, such as a wax capsule, and a flap actuated by the thermostatic actuator. A wax capsule comprises a cylinder filled with a temperature-sensitive wax. The wax repels a rod under the effect of a significant change in volume accompanying a change in solid/liquid phase, occurring at a threshold temperature. Such a thermostatic actuator automatically controls the opening stroke of the flap from a threshold temperature or a start-of-opening temperature. The closure of the flap is ensured by a biasing means, such as a spring, antagonist to the thermostatic actuator. The valve advantageously has a through section adapted to the passage of the nominal (maximum) flow rate provided for the thermostatic valve.

Although relatively powerful and inexpensive, wax capsule thermostats have a certain number of drawbacks. One of their major drawbacks is their reactivity at a single threshold temperature. Yet, depending on a method of operating the engine, it is sometimes beneficial to be able to open the flap of the thermostatic valve at a temperature below the change of state temperature of the wax. To overcome this drawback, it has been proposed in the prior art to add an electric heater intended to heat the wax. However, this type of electric heater does not make it possible to anticipate the opening of the thermostat below 20° C. of the threshold temperature, which is not always sufficient to ensure optimal operation of the engine. Moreover, the time between the moment when the wax is heated and the moment when the valve opens is generally long, which may be a problem, especially in the case where a rapid opening of the valve is necessary.

SUMMARY

To overcome the aforementioned problems of wax capsule thermostats, systems of electric spool valves have been developed in order to control the circulation of the heat transfer fluid in all conditions. These valves operate based on the principle of one or more spool(s) enabling the opening or the closure of radial windows, each dedicated to a branch of circulation. These valves thus make it possible to pilot the flow rate of the heat transfer fluid according to the temperature, but also according to other parameters, such as the load applied to the engine, the temperature of the intake air, or that of the cylinder head. Nonetheless, these valves require the installation of sensors in order to control the operating parameters and a control unit in order to manage the displacement of the spools. Furthermore, to ensure a good seal between the spool(s) and each branch of circulation, rigorous geometric and dimensional control is necessary. These valves therefore have a prohibitive cost that reserves them for high-end use. Moreover, due to the use of an electric actuator, these pilot-operated valves have a substantial size that prevents their installation on some types of vehicles.

Hence, the disclosure aims at providing a thermostatic valve making it possible to overcome the drawbacks of wax capsule thermostats while being of reduced cost and size.

To this end, according to a first aspect, the disclosure provides a thermostatic valve comprising a hollow body, a first opening and a second opening leading into the body and hydraulically connected by a through section and a plug disposed at least partially in the through section and comprising a thermostatic actuator, a biasing means, a flap capable of opening the first opening when actuated by the thermostatic actuator and of closing the first opening when biased by the biasing means, wherein the thermostatic actuator comprises a cylinder containing an expansion material, the volume of which increases beyond a threshold temperature, and a rod defining an axial direction, a relative displacement between the cylinder and the rod along the axial direction might occur under the action of the expansion material, characterized in that the rod bears at one of its ends against an abutment element, said abutment element being displaceable under the action of displacement means towards the cylinder so as to enable the opening of the first opening when the temperature of the expansion material is lower than the threshold temperature, said displacement means being at least partially disposed inside the through section.

Thus configured, the disclosure allows opening and closing the flap, independently of the temperature of the fluid circulating in the valve. Moreover, due to the partial positioning of the displacement means in the through section, the valve has a size substantially equivalent to that of a conventional thermostatic valve, equipped with a thermostatic actuator for example of the wax capsule type.

According to other features, the thermostatic valve of the disclosure includes one or more of the following optional features considered alone or according to any possible combination:

- the displacement means are capable of displacing the abutment element along the axial direction defined by the rod.
- the abutment element comprises a hollow cylindrical ring having at least one groove on its outer boundary, said groove defining a tapped portion, and a central hub connected to said ring by means of radial fins, said central hub being aligned with the rod and in contact therewith, and in that the displacement means comprise an electric actuator capable of displacing the central hub in rotation about an axis parallel to the axial direction and at least one raised protrusion formed on the inner boundary of the body, said protrusion defining a threaded portion into which is screwed the tapped portion of the ring such that the rotational displacement of the central hub causes the displacement along the axial direction of the abutment element.
- the abutment element comprises a hollow cylindrical ring and a central hub connected to said ring by means of radial fins, said central hub being aligned with the rod and in contact therewith, and in that the abutment element is slidingly mounted in the body, so that it is locked in rotation but may move in the axial direction, said abutment element being screwed into a connecting element or, conversely, said connecting element being screwed in the abutment element, the connecting element being able to move in rotation around an axis parallel to the axial direction under the action of an electric actuator, the rotational displacement of the connecting element ensuring the axial displacement of the abutment element.

the abutment element comprises four radial fins angularly spaced from each other.

a bore formed at one of the ends of the central hub is sized to receive one end of the rod which protrudes from the cylinder.

the threshold temperature is comprised between 20° C. and 115° C.

the expansion material is wax.

the thermostatic valve comprises sealing means capable of preventing a fluid circulation between the through section and an outer compartment partially accommodating the displacement means.

the sealing means comprise an O-ring gasket disposed at least partially around a connecting element positioned between the through section and the outer compartment and subjected to a rotational movement around an axis parallel to the axial direction under the action of the displacement means. The use of such a rotating connecting element, which may not be displaced axially, makes it possible to obtain a proper sealing between the through section and the outer compartment by means of a simple O-ring gasket.

the biasing means is a compression spring exerting an axial thrust against a cage at least partially surrounding the cylinder of the thermostatic actuator and resting against the flap, the cage moving along the axial direction under the combined action the thrust exerted by the compression spring and the counter thrust exerted by the flap during its displacement.

According to another aspect, the disclosure provides a fluid inlet or fluid outlet casing, for thermostatic regulation of a fluid circuit, comprising such a thermostatic valve.

BRIEF DESCRIPTION OF THE DRAWINGS

According to a particular configuration of the disclosure, the body of the valve is fastened on a frame of the casing by means of a bayonet-type connection.

The disclosure will be better understood upon reading the following non-limiting description, made with reference to the appended figures

DETAILED DESCRIPTION OF THE DRAWINGS

Figure 1:
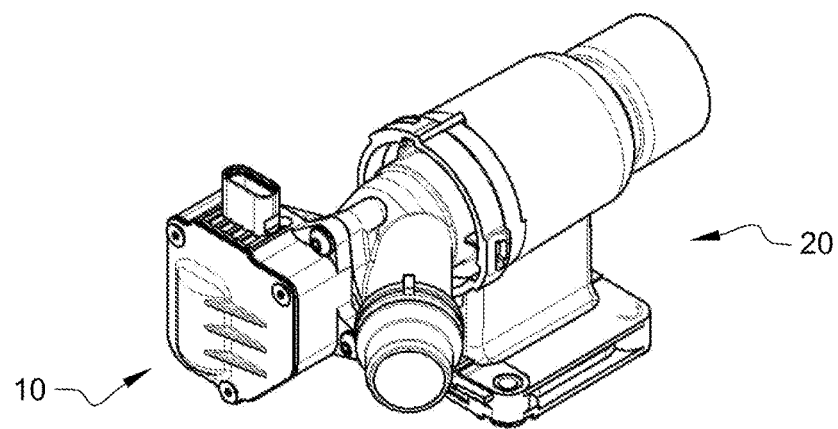
FIG. 1 is a perspective view of a water outlet casing provided with a thermostatic valve according to a particular embodiment of the disclosure.
Figure 2:
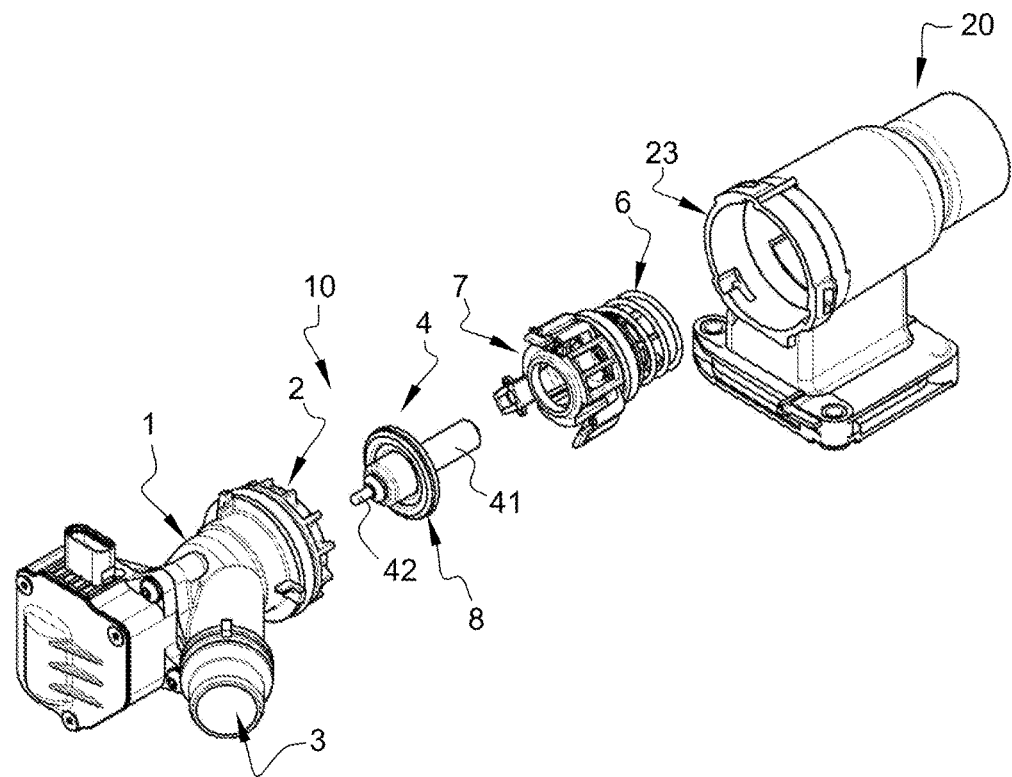
FIG. 2 is an exploded perspective view of the casing represented in FIG. 1.
Figure 3:
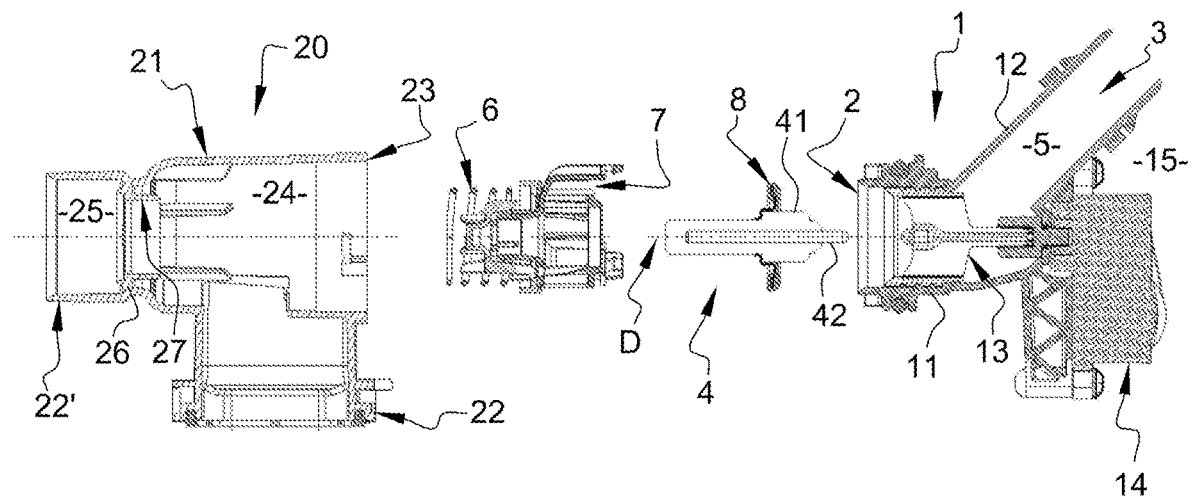
FIG. 3 is a sectional view of the casing as represented in FIG. 2.

FIG. 1 represents a cooling fluid outlet or inlet casing 20, the cooling fluid being in general glycol water. In the particular case of a fluid outlet casing, the casing 20 makes it possible to manage the circulation of the fluid from the engine to the radiator. Thus, depending on the temperature of the cooling fluid, the casing 20 directs or not the cooling fluid to the radiator in order to maintain the operating optimum temperature of the engine. The casing 20 has one or more inlets through which fluid may enter and one or more outlets through which fluid may exit. As represented in FIGS. 2 and 3, the casing 20 also has a circular opening 23 at its periphery, said opening 23 allowing a thermostatic valve 10 to be partially introduced inside the casing 20, then fastened to said casing 20, for example by means of a bayonet-type connection. Depending on the intended use and the engine equipping the vehicle, it will thus be possible to modify the circuit of the cooling fluid inside the casing 20 by simply modifying the thermostatic valve 10. The casing 20 may thus be used for relatively different uses and loads, which require specific controls of the coolant flow rate. In particular, the thermostatic valve 10 may be available in several versions: with a conventional thermostat (uncontrolled), a thermostat with heater (controlled) or with an electric actuator.

In the particular embodiment represented in FIGS. 1 to 3, the casing 20 comprises a frame 21. The frame 21 has a partition 26 separating two chambers 24, 25, respectively a chamber 24 for the intake of the cooling fluid from the engine, the fluid entering the casing 20 through an inlet conduit 22, and a chamber 25 for the return to a cooling fluid manifold, the fluid leaving the casing 20 through an outlet conduit 22'. The partition 26 has an opening extended by a conduit 27 allowing the two chambers 24, 25 to communicate with each other.

The casing 20 also incorporates a thermostatic valve 10. The valve 10 comprises a body 1 having a substantially cylindrical first portion 11 which is aligned with the opening 23 and which is fastened thereto, in particular by a bayonet-type connection, and a second substantially cylindrical portion 12 which is disposed obliquely with respect to the first portion. The body 1 forms a closed cavity except for a first opening 2, defined by the first portion 11, and a second opening 3, defined by the second portion 12, which lead into the body 1 and allow a fluid entry and/or output. In the case of a fluid outlet casing, the second opening 3 could for example allow a cooling fluid to be output towards a radiator so as to cool the fluid. The first opening 2 and the second opening 3 are connected by a through section 5. The valve 10 further comprises a plug disposed at least partially in the through section so as to selectively separate the first opening 2 from the second opening 3. Said plug is configured to be closed below a threshold temperature and thus to separate the first opening 2 from the second opening 3 in a tight manner by closing the through section 5, and to be open above the threshold temperature so as to fluidly connect the first opening 2 to the second opening 3, with the through section 5 being fully open and able to let a nominal/maximum flow rate pass therethrough.

For this purpose, the plug comprises a thermostatic actuator 4, a biasing means 6 and a flap 8. The flap 8 is capable of opening when actuated by the thermostatic actuator 4 and of closing when biased by the biasing means 6. The thermostatic actuator 4 typically comprises two actuation points and is capable of varying the distance and/or the force present between these two actuation points. A first actuation point is secured to the body 1 and a second actuation point is secured to the flap 8.

Figure 4:
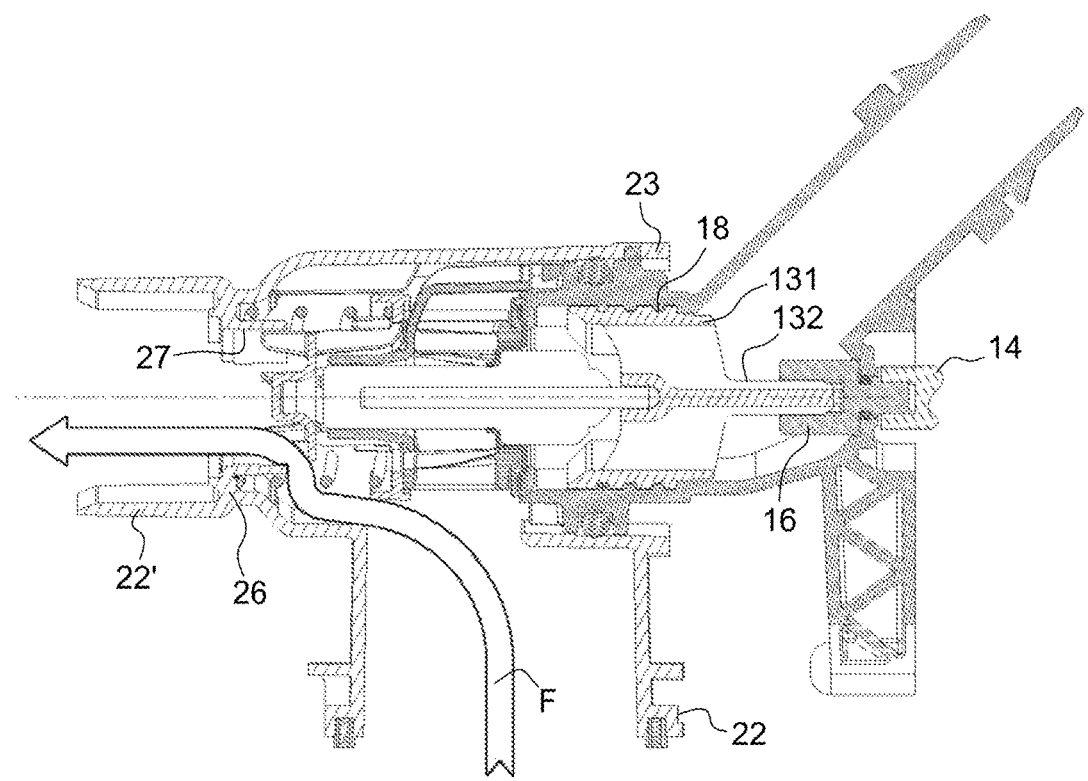
FIG. 4 is a sectional view of the casing as represented in FIG. 1, the flap being in the closed position.
Figure 5:
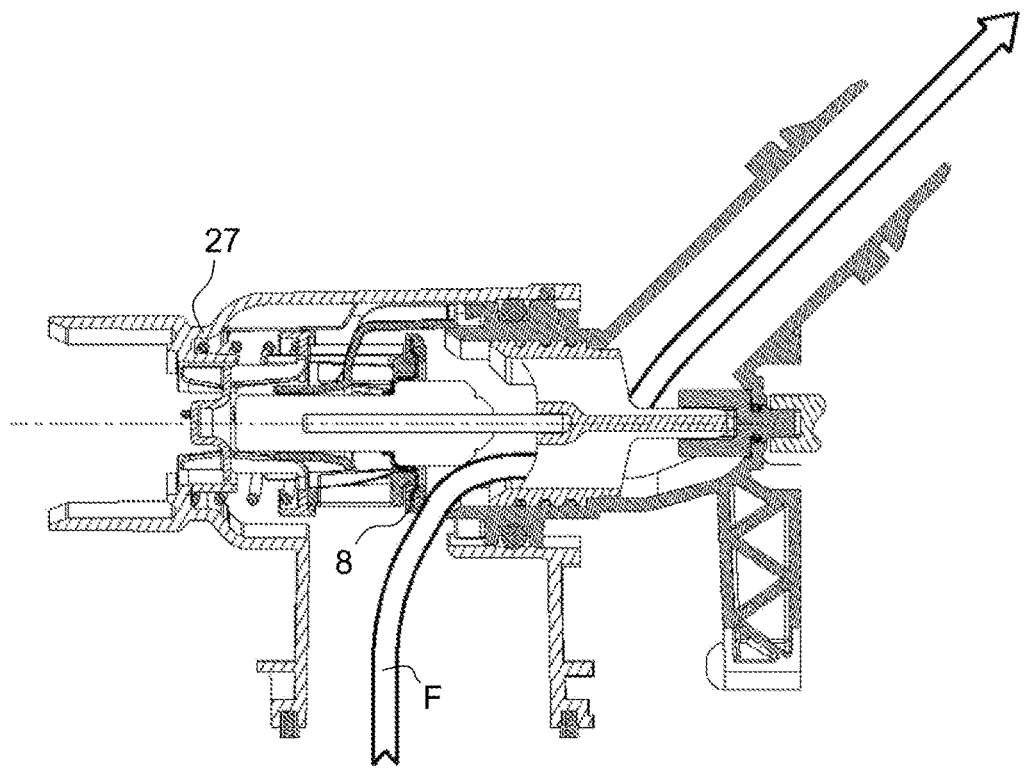
FIG. 5 is a view similar to FIG. 4, the flap having been displaced to the open position due to the displacement of the rod of the thermostatic actuator.

The thermostatic actuator 4 comprises in particular a cylinder 41 and a rod 42 engaged in the cylinder 41 along its axis and capable of coming out of the cylinder 41, said rod 42 being aligned in the direction D. The flap 8 with a substantially annular shape surrounds the periphery of the cylinder 41 and is secured thereto. As illustrated in FIGS. 4 and 5, the rod 42 of the thermostatic actuator 4 is fixed relative to the body 1 of the thermostatic valve 10 and the cylinder 41 of the thermostatic actuator 4 is movable relative to the rod 42 and displaces the flap 8 to which it is secured. This relative displacement between the cylinder 41 and the rod 42 results from the change of state of an expansion material contained in the cylinder 41 and against which bears one of the ends of the rod 42. This expansion material has in particular a threshold temperature beyond which it passes from the solid state to the liquid state and increases in volume. This increase in volume therefore generates a thrust force against the rod 42, which leads to the displacement of the cylinder 41 due to the immobility of the rod 42. In the case of a thermostatic actuator of the wax capsule type, the expansion material contained in the cylinder 41 is wax and the threshold temperature is generally comprised between 80° C. and 115° C. In the case of other thermostatic actuators, the threshold temperature may be less than 80° C. Thus, for thermostats equipping the air/water exchangers, this threshold temperature is comprised between 50° C. and 70° C. It may also be comprised between 20° C. and 50° C. for thermostats used in battery cooling circuits.

Thus, as represented in FIG. 4, when the temperature of the cooling fluid is below the threshold temperature of the expansion material, the flap 8 closes the opening 2 of the body 1, thus preventing any fluid output through the opening 3. The cooling fluid F therefore circulates only between chambers 24 and 25 of the casing 20 through the conduit 27.

As represented in FIG. 5, when the temperature of the cooling fluid is greater than the threshold temperature of the expansion material, the cylinder 41 moves in the direction of the conduit 27, which has the effect of moving the flap 8 away from the opening 2 of the body 1, thus enabling a circulation of the cooling fluid F through the opening 2, then in the through section 5 and finally through the opening 3.

The reverse passage from the position represented in FIG. 5 to that represented in FIG. 4 occurs during the gradual drop in the temperature of the cooling fluid and under the impulsion of the biasing means 6. In the represented embodiment, the biasing means 6 is a compression spring which is disposed between the partition 26 of the frame 21, and an intermediate part 7 defining a cage which at least partially surrounds the cylinder 41 of the thermostatic actuator 4 and which bears against the flap 8. The biasing means 6 therefore exerts, via the cage 7, an axial thrust against the flap 8 which is antagonist to the axial thrust exerted by the thermostatic actuator 4. Thus, the thermostatic actuator 4 ensures the opening of the flap 8 and the biasing means 6 ensures the closure of the flap 8 by pressing said flap 8 against its seat. Thus depending on the temperature, the thermostatic actuator 4 extends, opens the flap 8 and opposes the biasing means 6 by compressing it when the temperature exceeds the threshold temperature, while the biasing means 6 takes over, repels and closes the flap 8 and reduces the action of the thermostatic actuator 4 when the temperature drops below the threshold temperature.

Figure 7:
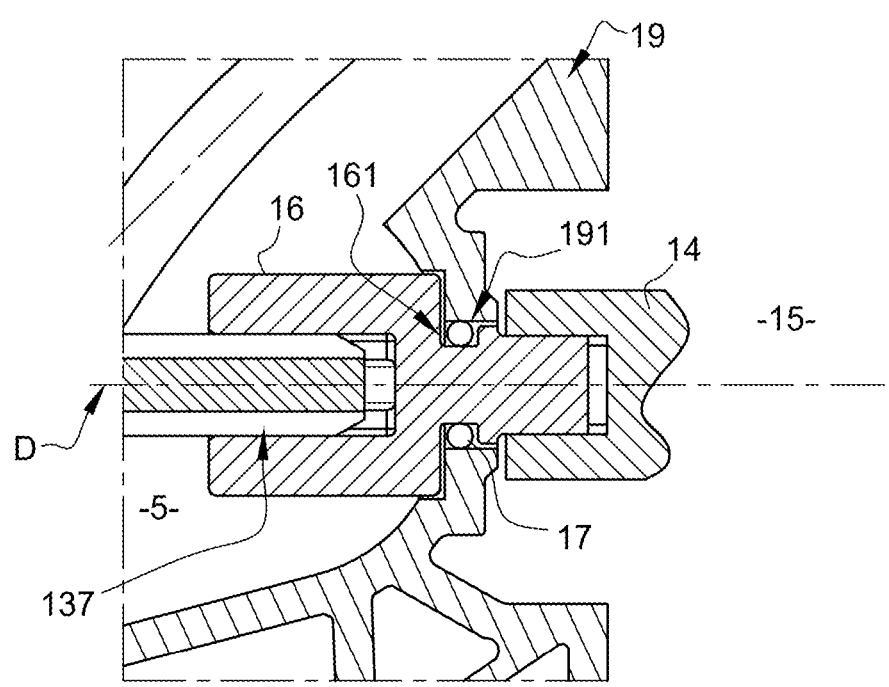
FIG. 7 is an enlarged view of a first construction detail of the casing as represented in FIG. 4.
Figure 8:
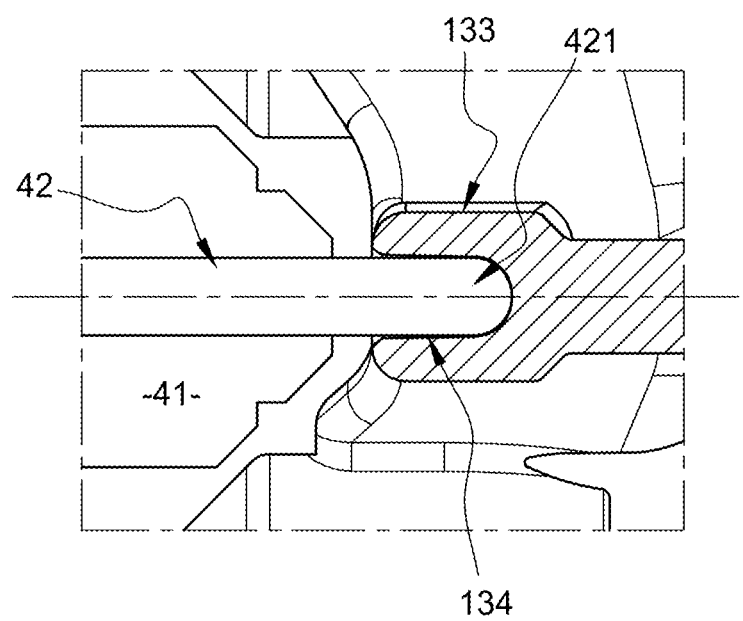
FIG. 8 is an enlarged view of a second construction detail of the casing as represented in FIG. 4.
Figure 9:
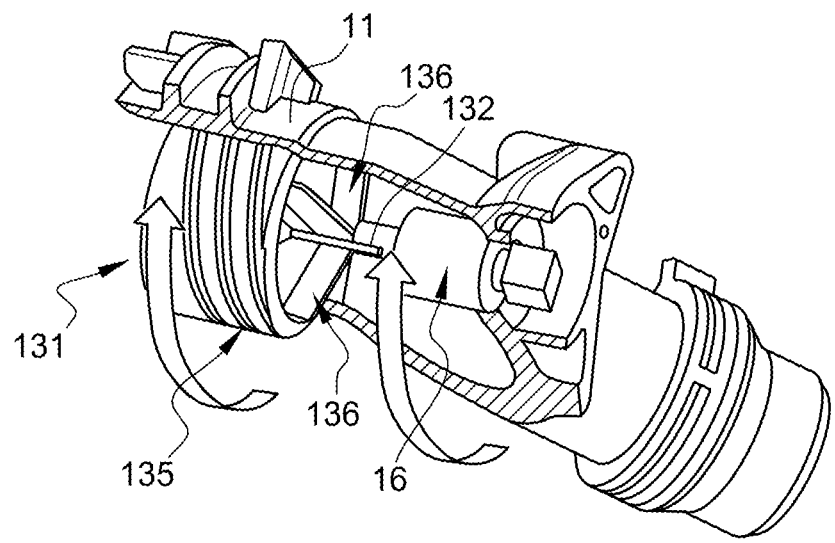
FIG. 9 is a partial sectional view of the thermostatic valve represented in FIG. 2.
Figure 10:
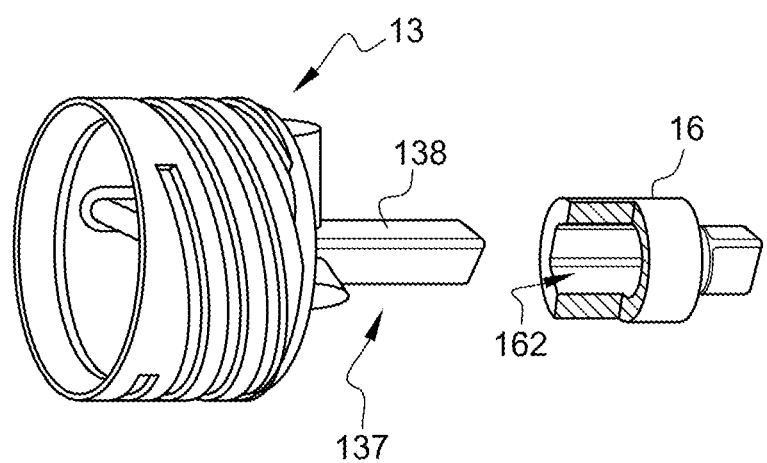
FIG. 10 is a perspective view showing the sliding connection between the abutment element and the connecting element of the casing of FIG. 1.

In order to ensure opening of the flap 8 for fluid temperatures below the threshold temperature of the expansion material of the thermostatic actuator, the valve 10 advantageously has displacement means making it possible to displace the first point of actuation of the thermostatic actuator 4. In the represented embodiment, the first actuation point is defined by an abutment element 13 against which abuts one of the ends of the rod 42 of the thermostatic actuator. As illustrated in detail in FIGS. 4 and 9, this abutment element 13 comprises a hollow cylindrical ring 131 having a helical groove 135 on its outer boundary, said groove 135 defining a tapped portion, and a central hub 132 connected to said ring 131 by means of several radial fins 136, for example four radial fins 136 angularly spaced from each other. The central hub 132 is aligned with the rod 42 and in contact with the latter at its end 133 which faces the cylinder 41. As illustrated in FIG. 8, the end 133 of the central hub 132 notably has an axial bore 134 which is dimensioned to receive the end 421 of the rod 42 which protrudes from the cylinder 41, the shape of the bore 134 being advantageously complementary to that of the rod 42. As illustrated in FIG. 7, the other end 137 of the central hub 132 is connected to a connecting element 16 disposed astride between the through section 5 and an outer compartment 15 accommodating an electric actuator 14. As illustrated in FIG. 10, the end 137 of the central hub 132 might for example be connected to the connecting element 16 by a sliding connection, the sliding connection resulting from the presence of splines 138 along the end 137 intended to slide inside a cavity 162 of the connecting element 16, said cavity 162 having a shape complementary to that of the end 137. Thus, the connecting element 16 may transmit a torque to the central hub 132, the two parts being free in translation. The electric actuator 14 is capable of transmitting a rotational movement to the connecting element 16 around the axis D such that the connecting element 16 is capable of transmitting a torque to the central hub 132. So as to avoid any entry of fluid into the outer compartment 15, an O-ring gasket 17 is disposed around the connecting element 16, at the level of an annular groove 161 formed at the periphery of said connecting element 16, such that the O-ring gasket 17 is positioned inside an opening 191 formed in a wall 19 separating the through section 5 from the outer compartment 15.

The rotational movement of central hub 132 is transmitted to the ring 131 via radial fins 136. As represented in FIGS. 4 and 9, the ring 131 is disposed in the cavity formed by the first portion 11 of the body 1 in such a way as to come into contact with the inner boundary thereof. Given that this inner boundary is provided with a helically-shaped raised protrusion 18, said protrusion 18 forming a threaded portion into which is screwed the tapped portion of the ring 131, during the rotation of the ring 131, a concomitant translational displacement along the axial direction D of the abutment element 13, occurs. This translational displacement makes it possible in particular to repel the rod 42 towards of the cylinder 41 when the abutment element 13 moves away from the connecting element 16. In the case where the temperature of the fluid is lower than the threshold temperature of the expansion material, the expansion material contained in cylinder 41 is in a solid state. The translational displacement of the rod 42 is therefore transmitted directly to the cylinder 41.

Figure 6:
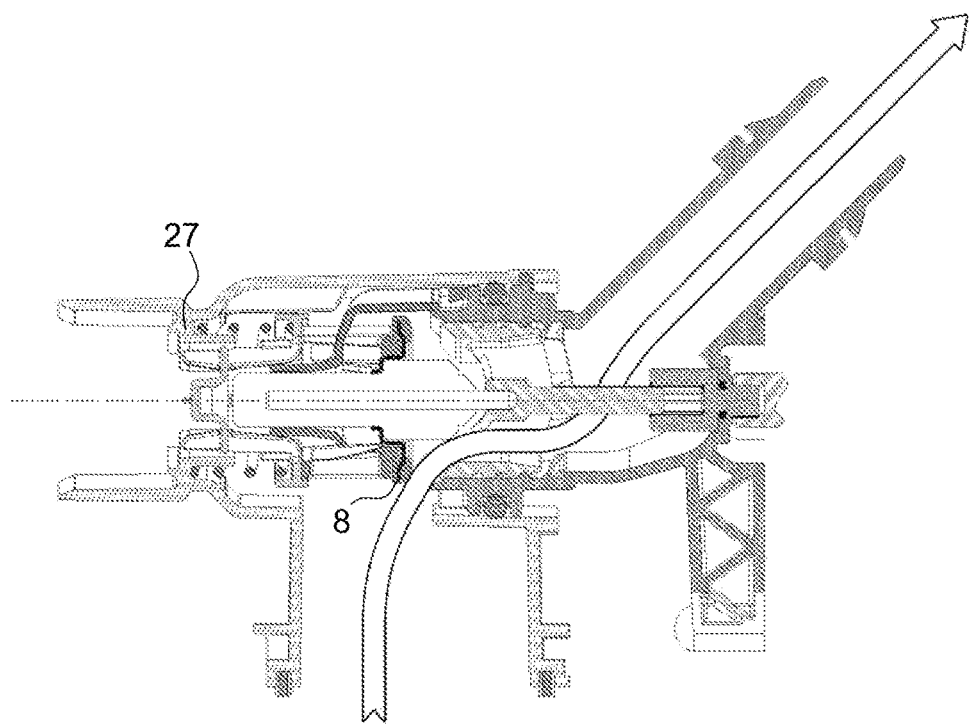
FIG. 6 is a view similar to FIG. 4, the flap being displaced to the open position due to the displacement of the abutment element.

As illustrated in FIG. 6, the cylinder 41 may therefore move towards the conduit 27 under the action of the abutment element 13, which has the effect of moving the flap 8 away from the opening 2 of the body 1, thus enabling a circulation of the cooling fluid F through the opening 2, then in the through section 5 and finally through the opening 3.

The reverse passage from the position represented in FIG. 6 to that represented in FIG. 4 occurs when the direction of rotation of the electric actuator 14 is reversed. Indeed, this rotational movement in the opposite direction leads to a translational movement of the abutment element 13 towards the connecting element 16 due to the interaction between the tapped portion of the ring 131 and of the threaded portion of the body 1. The thermostatic actuator 4, which is secured to the flap 8, is then repelled, under the action of the biasing means 6 and via the cage 7, towards the connecting element 16 until the flap 8 comes to rest against its seat, thus closing the opening 2 of the body 1.

Of course, the disclosure is not limited to the embodiment described above and illustrated by the various figures, this embodiment having been provided only as example. Modifications are still possible, in particular with regards to the constitution of the various elements or by substitution with technical equivalents, yet without departing from the scope of the disclosure.

In particular, the casing 20 could also be a water inlet manifold for a cooling circuit of an engine.

Moreover, in another variant of the disclosure (not represented), the abutment element 13 could be slidingly mounted in the body 1, so that it is locked in rotation but may move according to the axial direction D. It will be screwed into the connecting element 16, or, conversely, said connecting element 16 being screwed into the abutment element 13, the screwing/unscrewing of the abutment element 13, respectively of the connecting element 16, ensuring the axial displacement of the abutment element 13.

This variant could be made for example by overmolding a metal insert or a metal tapped rod.

The invention claimed is:

1. A thermostatic valve comprising: a hollow body, a first opening and a second opening leading into the body and being hydraulically connected by a through section, and a plug disposed at least partially in the through section and comprising a thermostatic actuator, a biasing component, a flap configured to open the first opening when actuated by the thermostatic actuator and of closing the first opening when biased by the biasing component, in which the thermostatic actuator comprises a cylinder containing an expansion material, having a volume that increases beyond a threshold temperature, and a rod defining an axial direction, a relative displacement between the cylinder and the rod along the axial direction being able to occur under the action of the expansion material, wherein the rod bears at one of its ends against an abutment element, said abutment element being displaceable under the action of a displacement assembly towards the cylinder so as to enable the opening of the first opening when the temperature of the expansion material is lower than the threshold temperature, said displacement assembly being at least partially disposed inside the through section, wherein the displacement assembly is configured to displace the abutment element along the axial direction defined by the rod, and wherein the abutment element comprises a hollow cylindrical ring having at least one groove on an outer boundary, said groove defining a tapped portion, and a central hub connected to said ring by radial fins, said central hub being aligned with the rod and in contact therewith, and wherein the displacement assembly comprises an electric actuator configured to displace the central hub in rotation about an axis parallel to the axial direction and at least one raised protrusion formed on the inner boundary of the body, said protrusion defining a threaded portion into which is screwed the tapped portion of the ring such that the rotational displacement of the central hub causes the translational displacement along the axial direction of the abutment element.

2. The thermostatic valve according to claim 1, wherein the abutment element comprises four radial fins angularly spaced from each other.

3. The thermostatic valve according to claim 1, wherein a bore formed at one of the ends of the central hub is dimensioned to receive an end of the rod which protrudes from the cylinder.

4. The thermostatic valve according to claim 1, wherein the threshold temperature is comprised between 20° C. and 115° C.

5. The thermostatic valve according to claim 1, wherein the expansion material is wax.

6. The thermostatic valve according to claim 1, further comprising sealing component configured to prevent a fluid circulation between the through section and an outer compartment partially accommodating the displacement assembly.

7. The thermostatic valve according to claim 6, wherein the sealing component includes an O-ring gasket disposed around a connecting element disposed between the through section and the outer compartment and subjected to a rotational movement around an axis parallel to the axial direction under the action of the displacement assembly.

8. The thermostatic valve according to claim 1, wherein the biasing component is a compression spring exerting an axial thrust against a cage surrounding at least partially the cylinder of the thermostatic actuator and resting against the flap, the cage moving along the axial direction under the combined action of the thrust exerted by the compression spring and the counter thrust exerted by the flap when displaced.

9. A fluid inlet or fluid outlet casing, for thermostatic regulation of a fluid circuit, comprising a thermostatic valve according to claim 1.

10. The fluid inlet or fluid outlet casing according to claim 9, wherein the body of the valve is fastened to a frame of the casing by a bayonet connection.

11. A thermostatic valve comprising: a hollow body, a first opening and a second opening leading into the body and being hydraulically connected by a through section, and a plug disposed at least partially in the through section and comprising a thermostatic actuator, a biasing component, a flap configured to open the first opening when actuated by the thermostatic actuator and of closing the first opening when biased by the biasing component, in which the thermostatic actuator comprises a cylinder containing an expansion material, having a volume that increases beyond a threshold temperature, and a rod defining an axial direction, a relative displacement between the cylinder and the rod along the axial direction being able to occur under the action of the expansion material, wherein the rod bears at one of its ends against an abutment element, said abutment element being displaceable under the action of a displacement assembly towards the cylinder so as to enable the opening of the first opening when the temperature of the expansion material is lower than the threshold temperature, said displacement assembly being at least partially disposed inside the through section, wherein the displacement assembly is configured to displace the abutment element along the axial direction defined by the rod, and wherein the abutment element comprises a hollow cylindrical ring and a central hub connected to said ring by radial fins, said central hub being aligned with the rod and in contact with the rod, wherein the abutment element is slidingly mounted in the body, such that the abutment element is locked in rotation but may move in the axial direction, said abutment element being screwed into a connecting element or, conversely, said connecting element being screwed into the abutment element, the connecting element being able to be displaced in rotation about an axis parallel to the axial direction under the action of an electric actuator, the rotational displacement of the connecting element ensuring the axial displacement of the abutment element.

12. The thermostatic valve according to claim 11, wherein the abutment element comprises four radial fins angularly spaced from each other.

13. The thermostatic valve according to claim 11, wherein a bore formed at one of the ends of the central hub is dimensioned to receive an end of the rod which protrudes from the cylinder.

14. The thermostatic valve according to claim 11, wherein the threshold temperature is comprised between 20° C. and 115° C.

15. The thermostatic valve according to claim 11, wherein the expansion material is wax.

16. The thermostatic valve according to claim 11, further comprising sealing component configured to prevent a fluid circulation between the through section and an outer compartment partially accommodating the displacement assembly.

17. The thermostatic valve according to claim 16, wherein the sealing component includes an O-ring gasket disposed around a connecting element disposed between the through section and the outer compartment and subjected to a rotational movement around an axis parallel to the axial direction under the action of the displacement assembly.

18. The thermostatic valve according to claim 11, wherein the biasing component is a compression spring exerting an axial thrust against a cage surrounding at least partially the cylinder of the thermostatic actuator and resting against the flap, the cage moving along the axial direction under the combined action of the thrust exerted by the compression spring and the counter thrust exerted by the flap when displaced.

19. A fluid inlet or fluid outlet casing, for thermostatic regulation of a fluid circuit, comprising a thermostatic valve according to claim 11.

20. The fluid inlet or fluid outlet casing according to claim 19, wherein the body of the valve is fastened to a frame of the casing by a bayonet connection.

* * * * *